Sept. 3, 1935.    R. POWELL    2,013,422
MICROSCOPE
Filed June 16, 1934
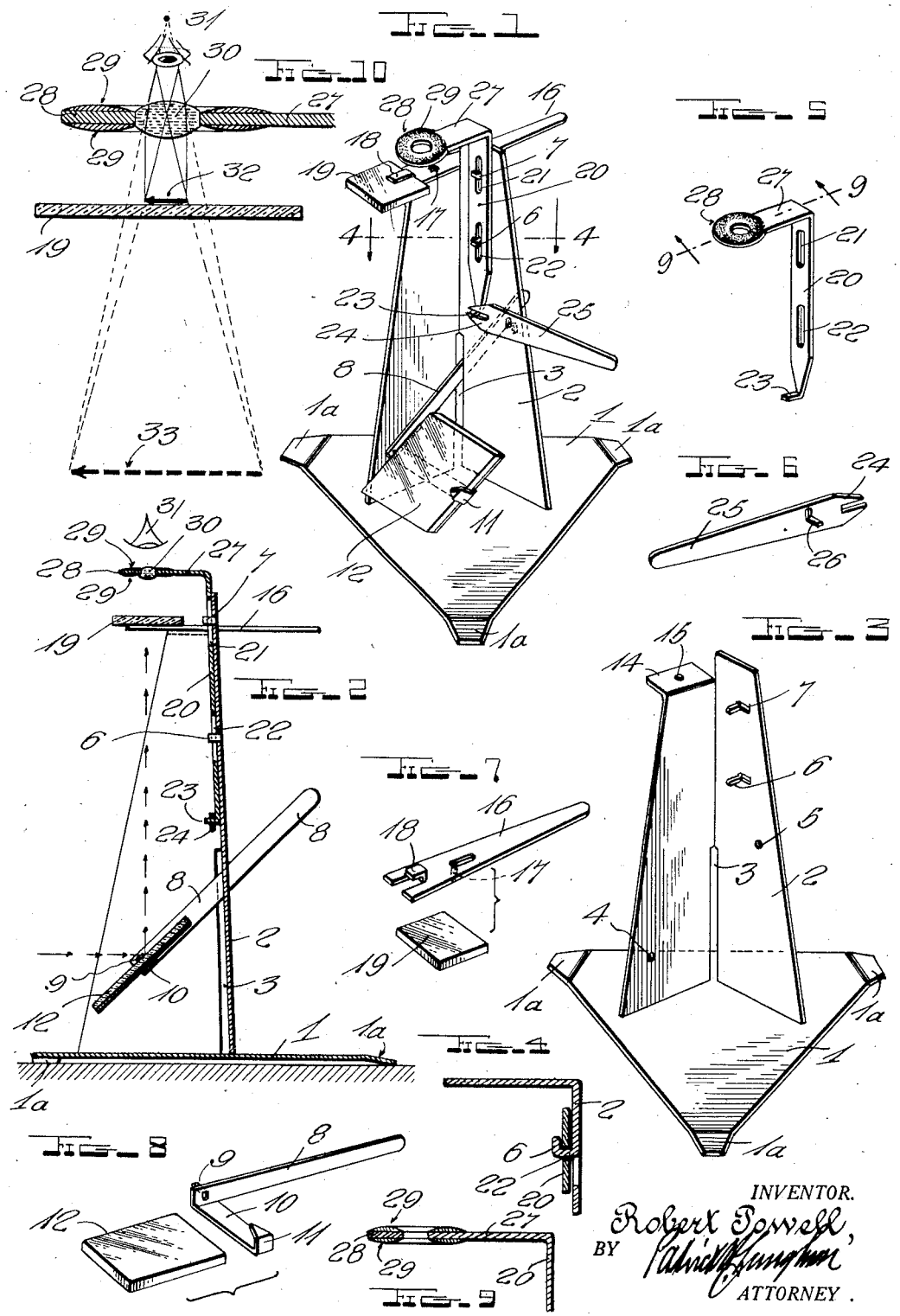

Patented Sept. 3, 1935

2,013,422

UNITED STATES PATENT OFFICE 2,013,422

MICROSCOPE

Robert Powell, Rupert, Idaho, assignor of one-half to Victor J. Smith, Burley, Idaho Application June 16, 1934, Serial No. 730,951

5 Claims. (Cl. 88—39)

My invention relates broadly to microscopes and more particularly to a construction of inexpensive microscope which may be employed in microscopic investigations by students.

One of the objects of my invention is to provide a construction of sheet metal support and mounting means for an inexpensive construction of microscope which is capable of manufacture and production on a quantity production basis for sale at extremely low cost thereby rendering the microscope practical for distribution to students in the microscopic study of organisms and specimens.

Another object of my invention is to provide a simplified construction of microscope including a support which may be stamped from sheet metal with means for accurately adjusting the focal distance of the microscope and the amount of light supplied to the specimen or organism under investigation.

Still another object of my invention is to provide a construction of microscope in which the effect of a lens is obtained by the support of a clear drop of water by the surface tension thereof in a lens holder in an adjustable position with respect to the light source and the organism or specimen under observation.

A further object of my invention is to provide a simplified construction of microscope in which a laterally shiftable carrier is arranged to support the organism or specimen under investigation and is adapted to be shifted to selected positions within the field of the observing lens or moved beyond the optical axis of the lens.

Other and further objects of my invention reside in the construction of sheet metal supporting means for the parts of a microscope and the arrangement of adjustable elements associated therewith, as set forth more fully in the specification hereinafter following by reference to the accompanying drawing, in which:

Figure 1 is a perspective view of the completely assembled microscope of my invention; Fig. 2 is a vertical longitudinal sectional view of the microscope of my invention; Fig. 3 is a perspective view of the standard erected on the sheet metal base of the microscope constructed in accordance with my invention; Fig. 4 is a cross-sectional view taken laterally through the standard on line 4—4 of Fig. 1; Fig. 5 is a perspective view of the vertically adjustable lens holder; Fig. 6 is a perspective view of the angularly adjustable lever which operates for focusing the lens holder; Fig. 7 is a perspective view of the parts comprising the specimen holder and adjusting means therefor; Fig. 8 is a perspective view of the adjusting lever and mirror employed for directing light through the specimen; Fig. 9 is an enlarged cross-sectional view of the lens holder; and Fig. 10 is a theoretical view showing the optical theory of the device of my invention.

My invention is directed to an inexpensive construction of microscope which can be supplied to students at such low cost as will greatly increase the possibility of instruction of large numbers of students in microscopic studies. Heretofore, in the art, microscopes have been relatively complicated and expensive devices beyond the reach of the average students and too costly to warrant the extensive use of such devices in public and other schools. The microscope of my invention has the parts thereof stamped from sheet metal. A base is provided for supporting a standard. Near the lower portion of the standard, I provide a pivotally mounted lever member connected with a carrier which supports a mirror. An adjustable lens holder is mounted adjacent the upper portion of the support. Intermediate the mirror and the lens holder, I provide an object glass which is supported on a lever member and which is pivotally mounted with respect to the standard. The lever member is angularly movable to shift the object glass into and out of alignment with the optical axis through the lens holder in order to enable a specimen to be placed on the object glass and moved to various positions for observation. In order to render the microscope extremely inexpensive, I employ as the lens in the microscope of my invention, a drop of clear water which is supported by its surface tension in the lens holder. I have found that extremely high degrees of magnification are possible in the microscope of my invention fully adequate to allow microscopic studies of organisms and specimens for acquiring extended scientific knowledge not possible by direct observation of such specimens or organisms.

Referring to the drawing in more detail, reference character 1 indicates a base having feet 1a disposed at spaced intervals serving to support the base 1 as a mounting means for the standard. The standard 2 is slotted as indicated at 3 adjacent the lower portion thereof and is apertured as indicated at 4 and 5. The slot 3 enables the lever 8 to extend therethrough. Lever 8 has a lug 9 struck therefrom. The lug 9 extends through aperture 4 in one side wall of the standard 2 and is upset or bent upon itself external to the wall 2 to allow free pivoting movement of lever 8. The lever 8 has an extension 10 thereon which is rolled over upon itself, as indicated at 11, to provide a carrier for mirror 12. Mirror 12 is adapted to be moved to an angular distance of approximately 45° for the purpose of reflecting light toward the specimen under observation.

The standard 2 is provided with instruck lugs 6 and 7 adjacent the extremity of one wall thereof, which lugs extend normal to the plane of the wall of the standard and pass through slots 21 and 22 in the vertically extending portion 20 of a lens holder. The lens holder has the extremity 23 thereof bent at right angles to form a lug, as shown at 23. The lug 23 is embraced by the forked end of the lever 25. Lever 25 has a lug 26 struck therefrom and extending through aperture 5 in the wall of the standard 2 and serving to adjust the position of the lens holder. The lens holder has a horizontally extending portion 27 which terminates in an annular portion 28. The annular portion 28 of the lens holder is coated on both its upper and lower surfaces with paraffine, as indicated at 29. The paraffine coatings 29 both above and below the lens holder serve to support, not being wetted by the fluid which is preferably water, the globule of fluid indicated at 30 by its own surface tension. The specimen under observation is placed upon the object glass 19 which is carried on the end of lever 16 by means of the frictional grip provided between lever 16 and lug 18.

Lever 16 has lug 17 struck therefrom and extended through aperture 15 in the horizontally extending portion 14 of standard 2. The object glass 19 may be shifted in a lateral plane to a position remote from the optical axis of the microscope to enable a specimen or organism to be placed upon the object glass 19 and the object glass then moved to a position coincident with the optical axis of the microscope. I have shown in Figs. 2 and 10 the optical theory embodied in the miscroscope of my invention. It will be seen that the mirror or light reflecting surface 12 receives light from a light source and directs the light through the object glass 19 and the specimen or organism thereon, which I have indicated generally by the arrow 32, and through the globule of fluid, indicated at 30, to the eye of the observer, represented at 31. The magnification of the specimen or organism 32 which is obtained is indicated by the apparent size of the specimen incident upon the retina of the eye, as represented by the dotted line arrow 33 in Fig. 10.

It is possible with the microscope of my invention to secure an apparent enlargement of a specimen or organism many times normal size. The focal distance for the device is approximately one-eighth of an inch. The annular portion 28 which supports the fluid lens must be protected from dust and the paraffine coating 29 must be maintained at a uniform thickness around the ring 28. Care must be taken not to scratch off or mar the paraffine covering 29 as such would cause distortion of the lens formed by the fluid globule. A little gentle heat applied preferably with a match will reflow the paraffine and rectify the tendency of the fluid to spread beyond the edges of the aperture in which it must be strictly confined. Heat must be applied only when the aperture is dry. I preferably employ clear water which may be applied to the ring 28 by the head of a small nail or match stem formerly dipped in clear water.

I have found the microscope of my invention highly practical in manufacture and production and very successful in its use and while I have described my invention in certain preferred embodiments, I desire that it be understood that modifications may be made and that no limitations upon my invention are intended other than are imposed by the scope of the appended claims.

What I claim as new and desire to secure by Letters Patent of the United States is as follows:

1. A microscope formed from sheet metal and comprising a supporting base structure, a sheet metal standard comprising a pair of vertical wings arranged in angular relation erected on said base structure, a sheet metal lens holder, means for mounting said lens holder on one wing of said standard adjacent the extremity thereof for adjustment in a vertical plane, a specimen carrier, means for mounting said carrier on the other wing of said standard for movement in a lateral plane beneath said lens holder, and means mounted on said standard for directing light through said specimen carrier on an axis passing through said lens holder.

2. A microscope constructed from sheet metal comprising a base, a sheet metal standard comprising a plurality of vertical wings arranged in angular relation erected on said base, a mirror carrier pivotally mounted on said standard adjacent said base, a lens holder, means for mounting said lens holder on one wing of said standard adjacent the extremity thereof for adjustment in a vertical plane, a second wing of said standard having the upper portion thereof bent into a horizontal plane, and a specimen carrier pivotally mounted on the horizontal portion of said second wing and movable in a lateral plane intermediate said lens holder and said mirror.

3. A microscope comprising a substantially flat metallic base, a sheet metal standard comprising wings arranged in angular relation vertically mounted on said base, said standard having a vertically disposed slot therein at the junction of said wings and adjacent said base, a mirror carrier pivotally mounted on one of said wings and having an adjusting lever connected therewith and projecting through the slot in said standard, a lens holder, means for mounting said lens holder for vertical adjustment adjacent the extremity of said standard, a specimen carrier, and means for mounting said carrier on said standard for movement in a lateral plane intermediate said lens holder and said mirror.

4. A microscope comprising, a base, an angular sheet metal standard erected on said base, a mirror adjustably mounted with respect to said standard, a lens holder formed of sheet metal comprising a vertically extending portion and a horizontally extending portion, said vertically extending portion being mounted in guides on said standard, a lever pivotally mounted on said standard and engaging the vertically extending portion of said lens holder for effecting a displacement of the horizontally extending portion of said lens holder, a lens mounted in said horizontal portion of said lens holder, and a specimen carrier pivotally mounted on said standard and movable in a lateral plane intermediate said lens holder and said reflecting mirror.

5. A microscope comprising a base, an angular sheet metal standard erected on said base, a slot in the bend of said angular standard extending upwardly from said base, a lever pivotally mounted on said standard adjacent said base and projecting through said slot in said standard, a reflecting surface carried by said lever adjustable through angular distance of approximately 45°, a lens holder formed of sheet metal and comprising a horizontally extending portion and a vertically extending portion having a lug projecting therefrom and longitudinal slots therein, guide lugs integral with said standard and engaging the slots in said vertically extending portion of said lens holder, a lever pivotally mounted on said standard, one end of said last mentioned lever being forked and engaging the projecting lug on said vertically extending portion of said lens holder, a specimen carrier pivotally mounted on said standard and movable in a lateral plane intermediate said reflecting surface and the horizontally extending portion of said lens holder, and a lense supported in said horizontal portion of said lens holder.

ROBERT POWELL.